US011627580B2

United States Patent
Feki et al.

(10) Patent No.: US 11,627,580 B2
(45) Date of Patent: Apr. 11, 2023

(54) BATTERY AWARE CARRIER ACTIVATION

(71) Applicant: NOKIA TECHNOLOGIES OY, Espoo (FI)

(72) Inventors: Afef Feki, Sceaux (FR); Fahad Syed Muhammad, Orsay (FR); Veronique Capdevielle, Magny les Hameaux (FR); Muhammad Majid Butt, Palaiseau (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/532,443

(22) Filed: Nov. 22, 2021

(65) Prior Publication Data
US 2022/0182997 A1 Jun. 9, 2022

(30) Foreign Application Priority Data
Dec. 4, 2020 (FI) ..................................... 20206253

(51) Int. Cl.
*H04W 72/04* (2009.01)
*H04W 72/0453* (2023.01)

(52) U.S. Cl.
CPC ..... *H04W 72/048* (2013.01); *H04W 72/0453* (2013.01); *H04W 72/0486* (2013.01)

(58) Field of Classification Search
None
See application file for complete search history.

(56) References Cited

U.S. PATENT DOCUMENTS

| 9,693,312 B2 | 6/2017 | Roessel et al. | |
|---|---|---|---|
| 10,757,601 B2 | 8/2020 | Wang et al. | |
| 2009/0257387 A1* | 10/2009 | Gholmieh | H04W 28/16 370/329 |
| 2009/0300399 A1* | 12/2009 | Archer | G06F 11/3409 709/224 |
| 2010/0235007 A1* | 9/2010 | Constien | G06F 1/3203 700/291 |
| 2012/0155407 A1 | 6/2012 | Lindoff et al. | |
| 2015/0245250 A1* | 8/2015 | Bhattacharjee | H04W 28/12 370/236 |
| 2016/0219487 A1 | 7/2016 | Khawer et al. | |

(Continued)

FOREIGN PATENT DOCUMENTS

| WO | 20200060089 A1 | 3/2020 |
|---|---|---|
| WO | WO 2020/145622 A1 | 7/2020 |

OTHER PUBLICATIONS

Extended European Search Report dated May 4, 2022, corresponding to European Patent Application No. 21207432.2.
(Continued)

*Primary Examiner* — Saba Tsegaye
(74) *Attorney, Agent, or Firm* — Squire Patton Boggs (US) LLP

(57) ABSTRACT

A method comprising receiving a first indication, from a terminal device, indicating that the terminal device is capable of supporting carrier aggregation, obtaining information regarding a battery level of the terminal device, estimating battery consumption per one carrier component, and based, at least partly, on the estimated battery consumption and information regarding the battery level, determining a number of additional carrier components to be activated for the terminal device.

16 Claims, 7 Drawing Sheets

(56) References Cited

U.S. PATENT DOCUMENTS

| | | | |
|---|---|---|---|
| 2017/0019851 | A1 | 1/2017 | Mackenzie et al. |
| 2017/0325123 | A1 | 11/2017 | Tabet et al. |
| 2018/0124784 | A1 | 5/2018 | Kumar et al. |
| 2019/0036673 | A1 | 1/2019 | Chen et al. |
| 2019/0363768 | A1 | 11/2019 | Wang et al. |
| 2020/0329832 | A1 | 10/2020 | Wang et al. |
| 2022/0006714 | A1* | 1/2022 | Wang .................... H04L 41/147 |
| 2022/0011850 | A1* | 1/2022 | Song .................. G06F 11/3062 |
| 2022/0150829 | A1* | 5/2022 | Yoon ................. H04W 52/0225 |
| 2022/0179381 | A1* | 6/2022 | Carrasco Schmidt .... H02J 3/32 |

OTHER PUBLICATIONS

Motorola: "Activation of Component Carriers", 3GPP Draft; R2-102470_LTEA_CC_Activation_V1A, 3rd Generation Partnership Project (3GPP), Mobile Competence Centre; 650, Route Des Lucioles; F-06921 Sophia-Antipolis Cedex; France, vol. RAN WG2, No. Beijing, China; Apr. 12, 2010, Apr. 6, 2010.

Office Action dated Mar. 1, 2021 corresponding to Finnish Patent Application No. 20206253.

Finnish Search Report dated Mar. 1, 2021 corresponding to Finnish Patent Application No. 20206253.

Communication of Acceptance under section 29a of Patents Decree dated Aug. 20, 2021 corresponding to Finnish Patent Application No. 20206253.

Chinese Office Action corresponding to CN Appln. No. 202111459473. 4, dated Jan. 20, 2023.

* cited by examiner

BATTERY AWARE CARRIER ACTIVATION

CROSS REFERENCE TO RELATED APPLICATION

This application claims the benefit of Finnish Patent Application No. 20206253, filed Dec. 4, 2020. The entire content of the above-referenced application is hereby incorporated by reference.

FIELD

The following exemplary embodiments relate to wireless communication and ensuring quality of service.

BACKGROUND

Wireless communication enables connecting to various devices in all kinds of environments. As technology develops, more data may be transmitted faster. Yet wireless terminal devices are often powered using batteries and thus it may be beneficial to account for aspects regarding batteries.

BRIEF DESCRIPTION

The scope of protection sought for various embodiments of the invention is set out by the independent claims. The exemplary embodiments and features, if any, described in this specification that do not fall under the scope of the independent claims are to be interpreted as examples useful for understanding various embodiments of the invention.

According to an aspect there is provided an apparatus comprising at least one processor, and at least one memory including a computer program code, wherein the at least one memory and the computer program code are configured, with the at least one processor, to cause the apparatus to receive a first indication, from a terminal device, indicating that the terminal device is capable of supporting carrier aggregation, obtain information regarding a battery level of the terminal device, estimate battery consumption per one carrier component, and based, at least partly, on the estimated battery consumption and information regarding the battery level, determine a number of additional carrier components to be activated for the terminal device.

According to an aspect there is provided an apparatus comprising at least one processor, and at least one memory including a computer program code, wherein the at least one memory and the computer program code are configured, with the at least one processor, to cause the apparatus to transmit, to an access node, a first indicating that the apparatus is capable of supporting carrier aggregation, receive, from the access node, a request for information regarding a battery level of the apparatus, transmit, to the access node, a second indication comprising information regarding the battery level of the apparatus, and receive, from the access node, activation of one or more additional carrier components.

According to another aspect there is provided an apparatus comprising means for receiving a first indication, from a terminal device, indicating that the terminal device is capable of supporting carrier aggregation, obtaining information regarding a battery level of the terminal device, estimating battery consumption per one carrier component, and based, at least partly, on the estimated battery consumption and information regarding the battery level, determining a number of additional carrier components to be activated for the terminal device.

According to another aspect there is provided an apparatus comprising means for transmitting, to an access node, a first indicating that the apparatus is capable of supporting carrier aggregation, receiving, from the access node, a request for information regarding a battery level of the apparatus, transmitting, to the access node, a second indication comprising information regarding the battery level of the apparatus, and receiving, from the access node, activation of one or more additional carrier components.

According to another aspect there is provided a method comprising receiving a first indication, from a terminal device, indicating that the terminal device is capable of supporting carrier aggregation, obtaining information regarding a battery level of the terminal device, estimating battery consumption per one carrier component, and based, at least partly, on the estimated battery consumption and information regarding the battery level, determining a number of additional carrier components to be activated for the terminal device.

According to another aspect there is provided a method comprising transmitting, to an access node, a first indicating that the apparatus is capable of supporting carrier aggregation, receiving, from the access node, a request for information regarding a battery level of the apparatus, transmitting, to the access node, a second indication comprising information regarding the battery level of the apparatus, and receiving, from the access node, activation of one or more additional carrier components.

According to another aspect there is provided a computer program comprising instructions for causing an apparatus to perform at least the following: receive a first indication, from a terminal device, indicating that the terminal device is capable of supporting carrier aggregation, obtain information regarding a battery level of the terminal device, estimate battery consumption per one carrier component, and based, at least partly, on the estimated battery consumption and information regarding the battery level, determine a number of additional carrier components to be activated for the terminal device.

According to another aspect there is provided a computer program comprising instructions for causing an apparatus to perform at least the following: transmit, to an access node, a first indicating that the apparatus is capable of supporting carrier aggregation, receive, from the access node, a request for information regarding a battery level of the apparatus, transmit, to the access node, a second indication comprising information regarding the battery level of the apparatus, and receive, from the access node, activation of one or more additional carrier components.

According to another aspect there is provided a computer program product comprising instructions for causing an apparatus to perform at least the following: receive a first indication, from a terminal device, indicating that the terminal device is capable of supporting carrier aggregation, obtain information regarding a battery level of the terminal device, estimate battery consumption per one carrier component, and based, at least partly, on the estimated battery consumption and information regarding the battery level, determine a number of additional carrier components to be activated for the terminal device.

According to another aspect there is provided a computer program product comprising instructions for causing an apparatus to perform at least the following: transmit, to an access node, a first indicating that the apparatus is capable of supporting carrier aggregation, receive, from the access node, a request for information regarding a battery level of the apparatus, transmit, to the access node, a second indication comprising information regarding the battery level of the apparatus, and receive, from the access node, activation of one or more additional carrier components.

According to another aspect there is provided a computer program comprising instructions stored thereon for performing at least the following: receive a first indication, from a terminal device, indicating that the terminal device is capable of supporting carrier aggregation, obtain information regarding a battery level of the terminal device, estimate battery consumption per one carrier component, and based, at least partly, on the estimated battery consumption and information regarding the battery level, determine a number of additional carrier components to be activated for the terminal device.

According to another aspect there is provided a computer program comprising instructions stored thereon for performing at least the following: transmit, to an access node, a first indicating that the apparatus is capable of supporting carrier aggregation, receive, from the access node, a request for information regarding a battery level of the apparatus, transmit, to the access node, a second indication comprising information regarding the battery level of the apparatus, and receive, from the access node, activation of one or more additional carrier components.

According to another aspect there is provided a non-transitory computer readable medium comprising program instructions for causing an apparatus to perform at least the following: receive a first indication, from a terminal device, indicating that the terminal device is capable of supporting carrier aggregation, obtain information regarding a battery level of the terminal device, estimate battery consumption per one carrier component, and based, at least partly, on the estimated battery consumption and information regarding the battery level, determine a number of additional carrier components to be activated for the terminal device.

According to another aspect there is provided a non-transitory computer readable medium comprising program instructions for causing an apparatus to perform at least the following: transmit, to an access node, a first indicating that the apparatus is capable of supporting carrier aggregation, receive, from the access node, a request for information regarding a battery level of the apparatus, transmit, to the access node, a second indication comprising information regarding the battery level of the apparatus, and receive, from the access node, activation of one or more additional carrier components.

According to another aspect there is provided a non-transitory computer readable medium comprising program instructions stored thereon for performing at least the following: receive a first indication, from a terminal device, indicating that the terminal device is capable of supporting carrier aggregation, obtain information regarding a battery level of the terminal device, estimate battery consumption per one carrier component, and based, at least partly, on the estimated battery consumption and information regarding the battery level, determine a number of additional carrier components to be activated for the terminal device.

According to another aspect there is provided a non-transitory computer readable medium comprising program instructions stored thereon for performing at least the following: transmit, to an access node, a first indicating that the apparatus is capable of supporting carrier aggregation, receive, from the access node, a request for information regarding a battery level of the apparatus, transmit, to the access node, a second indication comprising information regarding the battery level of the apparatus, and receive, from the access node, activation of one or more additional carrier components.

LIST OF DRAWINGS

In the following, the invention will be described in greater detail with reference to the embodiments and the accompanying drawings, in which FIG. 1 illustrates an exemplary embodiment of a radio access network.

Figure 4:
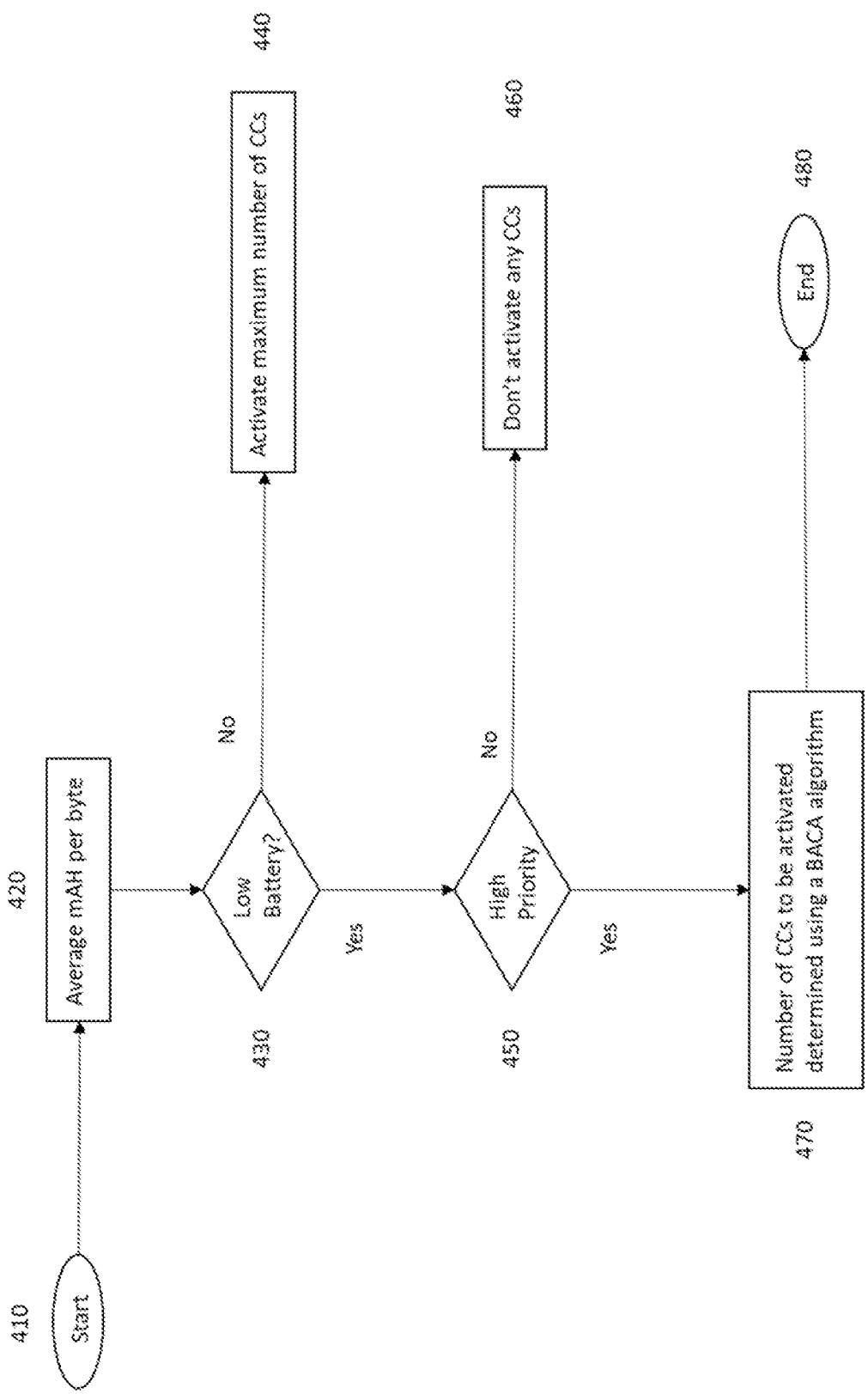

FIG. 4 a flow chart according to an exemplary embodiment of battery aware carrier aggregation activation.

Figure 5:
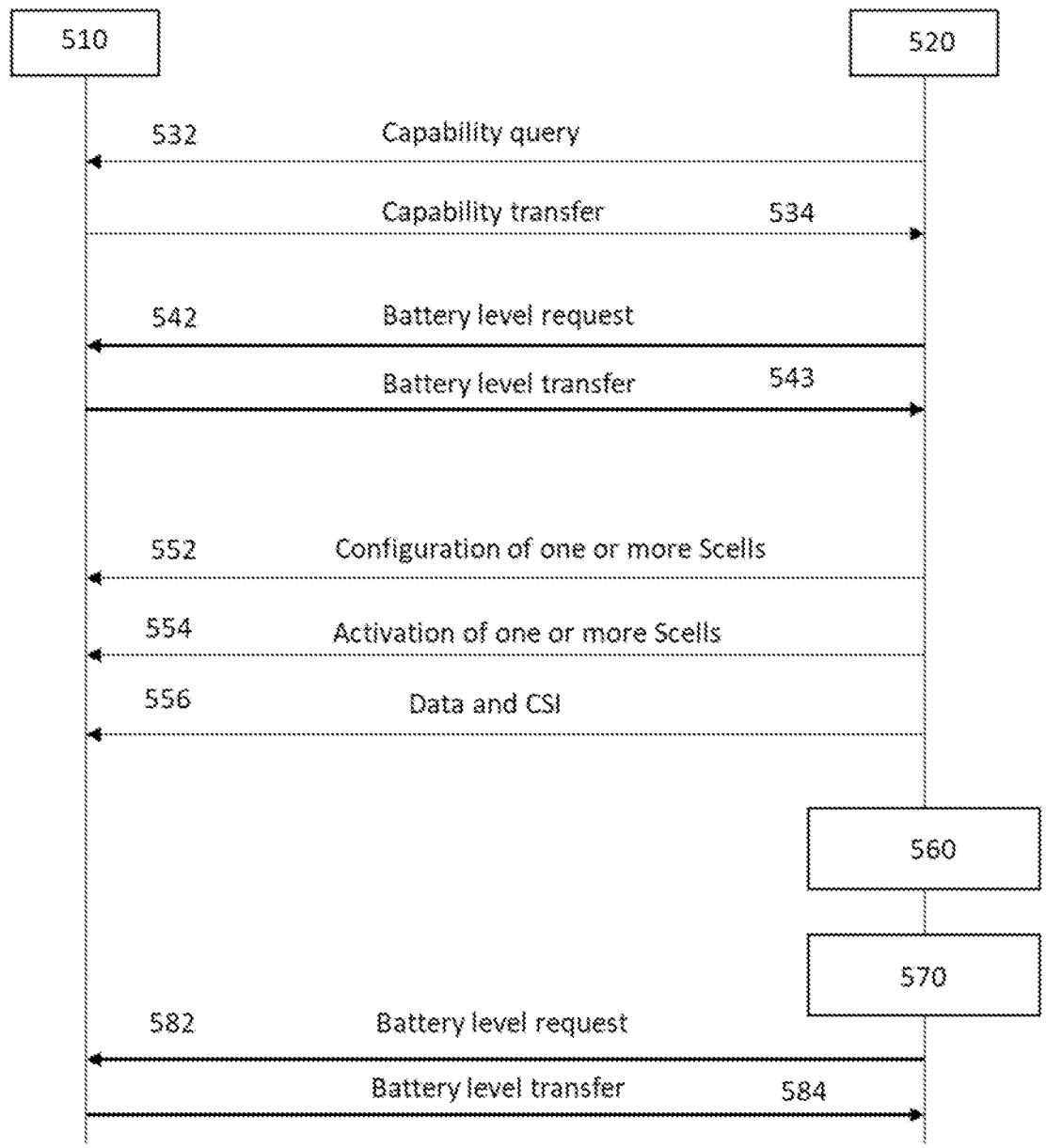

FIG. 5 illustrates an exemplary embodiment of signalling between an access node and a terminal device.

Figure 6:
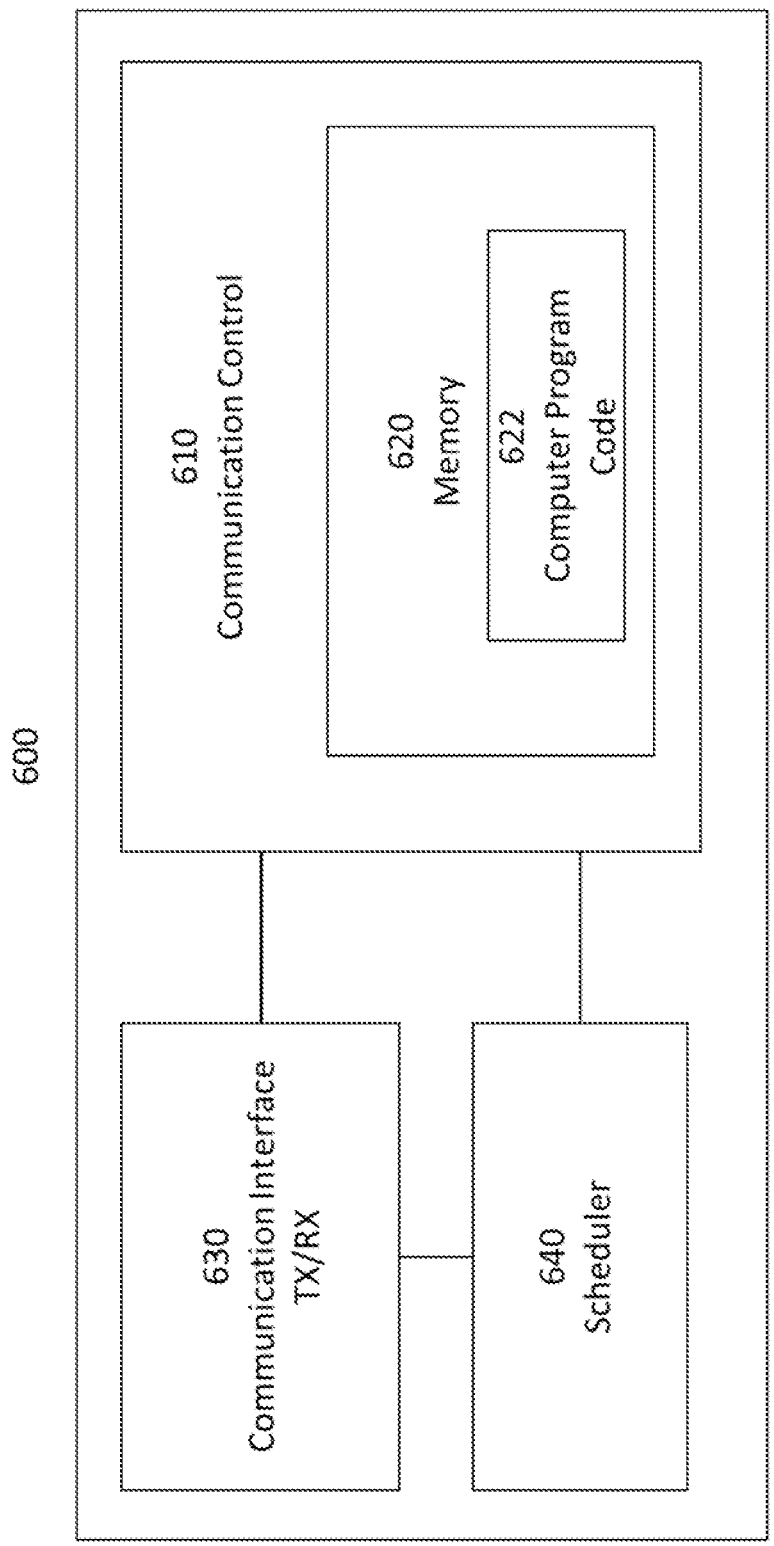
Figure 7:
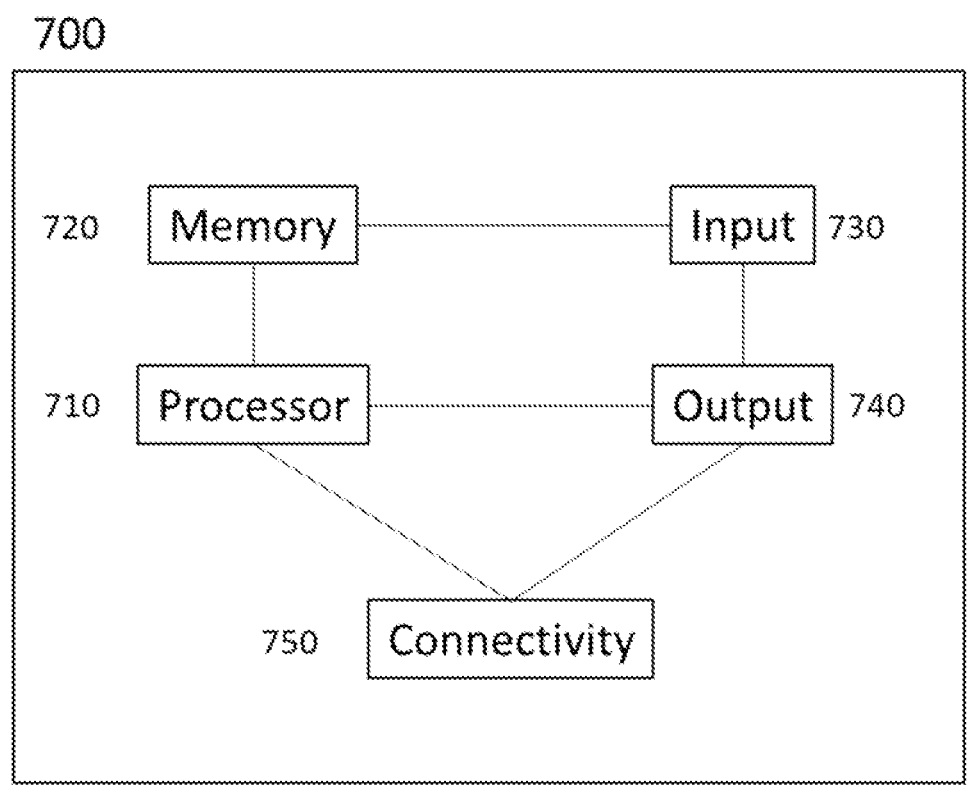

FIG. 6 and FIG. 7 illustrate exemplary embodiments of an apparatus.

DESCRIPTION OF EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, microcontrollers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via any suitable means. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments described herein may be implemented in a communication system, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system. The embodiments are not, however, restricted to the system given as an example but a person skilled in the art may apply the solution to other communication systems provided with necessary properties.

As used herein, the term "determining" (and grammatical variants thereof) can include, not least: calculating, computing, processing, deriving, measuring, investigating, looking up (e.g., looking up in a table, a database or another data structure), ascertaining and the like. Also, "determining" can include receiving (e.g., receiving information), accessing (e.g., accessing data in a memory), obtaining and the like. Also, "determining" can include resolving, selecting, choosing, establishing, and the like.

Figure 1:
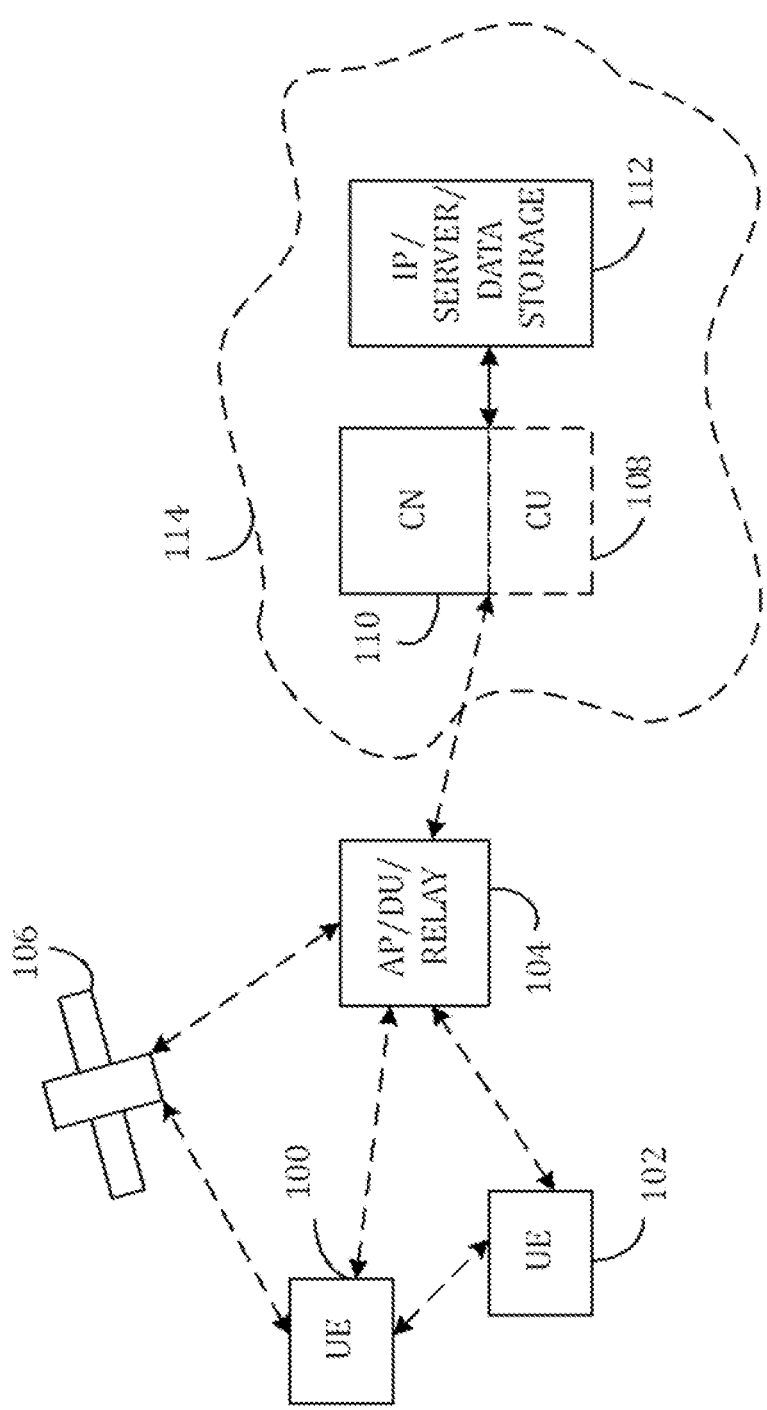

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1. The example of FIG. 1 shows a part of an exemplifying radio access network.

FIG. 1 shows terminal devices 100 and 102 configured to be in a wireless connection on one or more communication channels in a cell with an access node (such as (e/g)NodeB) 104 providing the cell. The access node 104 may also be referred to as a node. The physical link from a terminal device to a (e/g)NodeB is called uplink or reverse link and the physical link from the (e/g)NodeB to the terminal device is called downlink or forward link. It should be appreciated that (e/g)NodeBs or their functionalities may be implemented by using any node, host, server or access point etc. entity suitable for such a usage. It is to be noted that although one cell is discussed in this exemplary embodiment, for the sake of simplicity of explanation, multiple cells may be provided by one access node in some exemplary embodiments.

A communication system may comprise more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side may be a serving gateway (S-GW, routing and forwarding user data packets), packet data network gateway (P-GW), for providing connectivity of terminal devices (UEs) to external packet data networks, or mobile management entity (MME), etc.

The terminal device (also called UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via F1AP-interface for example.

The terminal device may refer to a portable computing device that includes wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be an exclusive or a nearly exclusive uplink only device, of which an example is a camera or video camera loading images or video clips to a network. A terminal device may also be a device having capability to operate in Internet of Things (IoT) network which is a scenario in which objects are provided with the ability to transfer data over a network without requiring human-to-human or human-to-computer interaction. The terminal device may also utilise cloud. In some applications, a terminal device may comprise a small portable device with radio parts (such as a watch, earphones or eyeglasses) and the computation is carried out in the cloud. The terminal device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE, including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, namely below 6 GHz and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave).

The communication system is also able to communicate with other networks, such as a public switched telephone network or the Internet 112, and/or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

It should also be understood that the distribution of labour between core network operations and base station operations may differ from that of the LTE or even be non-existent. Some other technology that may be used includes for example Big Data and all-IP, which may change the way networks are being constructed and managed. 5G (or new radio, NR) networks are being designed to support multiple hierarchies, where MEC servers can be placed between the core and the base station or 5G-nodeB (gNB). It should be appreciated that MEC can be applied in 4G networks as well.

5G may also utilize satellite communication to enhance or complement the coverage of 5G service, for example by providing backhauling. Possible use cases comprise providing service continuity for machine-to-machine (M2M) or Internet of Things (loT) devices or for passengers on board of vehicles, and/or ensuring service availability for critical communications, and/or future railway/maritime/aeronautical communications. A satellite 106 that may be utilized in 5G may cover several satellite-enabled network entities that create on-ground cells. The on-ground cells may be created through an on-ground relay node 104 or by a gNB located on-ground or in a satellite or part of the gNB may be on a satellite, the DU for example, and part of the gNB may be on the ground, the CU for example.

It is to be noted that the depicted system is an example of a part of a radio access system and the system may comprise a plurality of (e/g)NodeBs, the terminal device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In some exemplary embodiments, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)NodeBs, may include, in addition to Home (e/g)NodeBs (H(e/g)nodeBs), a home node B gateway, or HNB-GW (not shown in FIG. 1). An HNB Gateway (HNB-GW), which may be installed within an operator's network may aggregate traffic from a large number of HNBs back to a core network.

Carrier aggregation may be utilized for increasing bandwidth, and thereby also bitrate. Carrier aggregation may be used with various cellular communication technologies such as 4G and 5G as well as with any envisaged future cellular communication technologies such as 5G+. For example, with 5G carrier aggregation may be used for extending coverage of mid and high frequency bands which also helps to increase capacity. In carrier aggregation, CA, component carriers, CC, at different centre frequencies are combined. In CA, transmitting may occur simultaneously both in downlink, DL, and uplink, UL, on the aggregated CCs. Exemplary embodiments of CA in which component carriers are contiguous in the same frequency band may be called as intra-band contiguous carrier aggregation. Exemplary embodiments of CA in which component carriers are in the same frequency band but are separated by a gap may be called as intra-band non-contiguous. Also, exemplary embodiments of CA in which component carriers lie in different frequency band may be called as inter-band carrier aggregation.

If a terminal device is capable of supporting carrier aggregation, there may be one primary component carrier between the terminal device and an access node, which may be for example a gNB. Additionally, one or more secondary component carriers both in the UL and the DL may be configured. Different terminal devices may have different component carriers as their primary component carrier, PCC. A CA configuration may thus be understood as the process of adding one or more secondary component carriers, SCC. The CA configuration may be handled at the radio resource control, RRC, layer of the 3GPP protocol stack. The configured one or more SCCs may be in an active or in an inactive state. Activation of CA may be performed, at least partly, at the medium access control, MAC, layer of the 3GPP-protocol stack.

In some exemplary embodiments, the one or more SCCs may be activated blindly. Alternatively, in some other exemplary embodiments, the one or more SCCs may be activated through radio measurements reported by the terminal device. Activation of the one or more SCCs may be performed for example when there is an increase in traffic demand which cannot be supported by the currently active CCs. In such a case, one or more additional SCCs may be activated for the terminal device from CCs that are configured for the terminal device.

In some exemplary embodiment, CA activation may be based on information regarding a data buffer of the terminal device. In such an exemplary embodiment the one or more additional SCCs may be activated based on traffic load conditions of the terminal device. While this may be a useful and effective approach, there may, however, be a considerable impact on the battery life of the terminal device. Moreover, the impact on the battery lifetime may be more stringent with increasing number of CCs, due to the battery consuming physical downlink control channel, PDCCH, scanning operation and/or due to uplink operations on additional activated CCs.

Thus, it is beneficial if the battery level of the terminal device may be taken into account when activating CA. For example, devices with limited battery capacity may benefit greatly if the battery level is taken into account when activating one or more additional CCs. For example, if CA activation is performed based on data buffer, the CA may be steered to select a maximum number of CCs regardless of the impact that may have on the battery of the terminal device. Thus, it is beneficial to consider also the battery state information of the terminal device proactively when determining if the CA activation is to be performed in order to prolong the battery life as well as guarantee enhanced quality of experience.

Yet, if battery level information is taken into account when determining if CA activation is to be performed, the number of additional CCs to be activated may be optimized instead of just activating the maximum number of additional CCs. This approach may be called as battery aware carrier activation, BACA. BACA may have the advantage of helping to avoid draining the battery of the terminal device while at the same time ensuring requested quality of experience.

Figure 2:
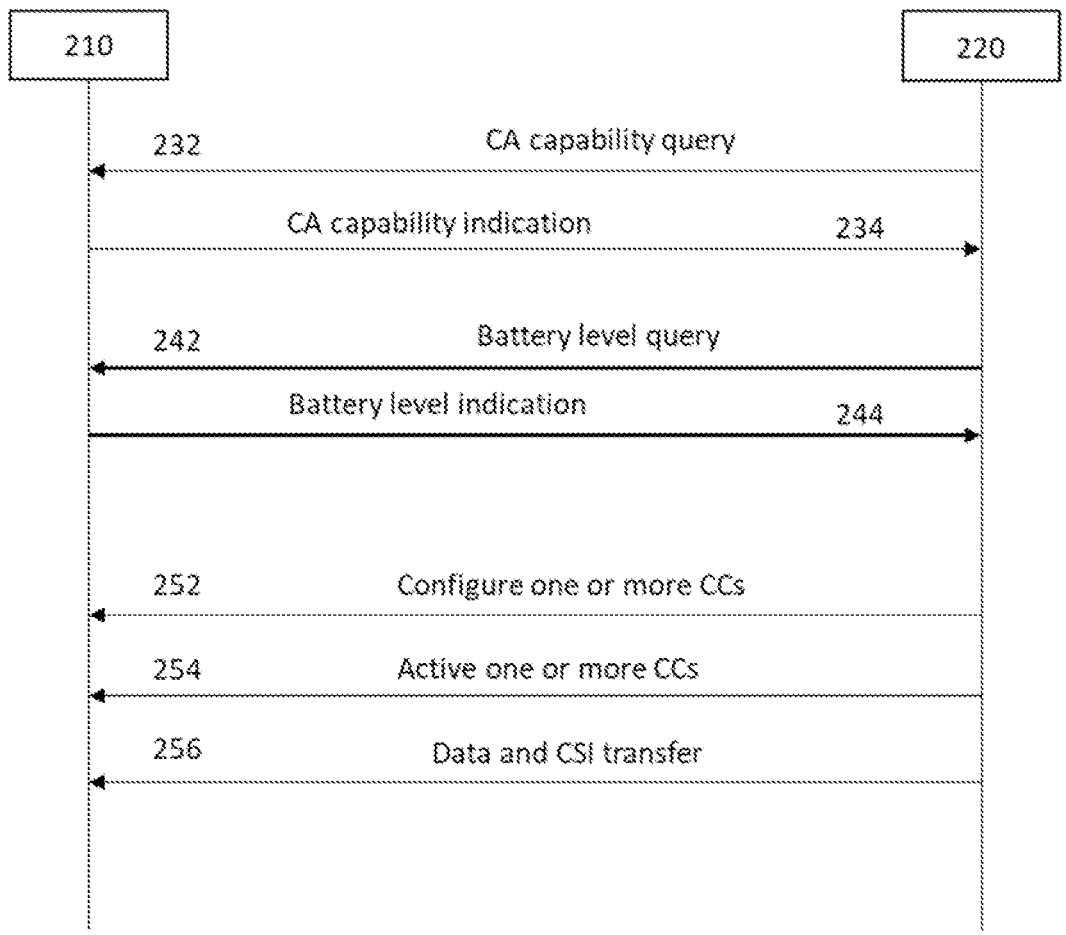
FIG. 2 illustrates an exemplary embodiment of signalling in an exemplary embodiment of battery aware carrier aggregation activation.

FIG. 2 illustrates an exemplary embodiment of signalling according to an exemplary embodiment utilizing BACA. The signalling takes place between a terminal device 210 and an access node 220 that in this exemplary embodiment is a gNB. The access node 220 transmits an enquiry 232 regarding capability, which in this exemplary embodiment is the capability for CA, of the terminal device 210. The terminal device 234 then transmits indication 234 indicating the capability which in this exemplary embodiment indicates that the terminal device 210 is capable to support carrier aggregation. Next, the access node 220 transmits an enquiry 242 regarding the battery level of the terminal device 210. The terminal device 210 then transmits an indication 244 comprising information regarding its battery level. After this, the access node 220 then transmits signalling 252 to configure one or more secondary cells corresponding to the one or more secondary carrier components that are to be configured. Then the access node 220 transmits signalling 254 to activate the one or more secondary cells and finally the access node 220 transmits signalling 256 comprising data and channel state information, CSI, transfer.

Figure 3:
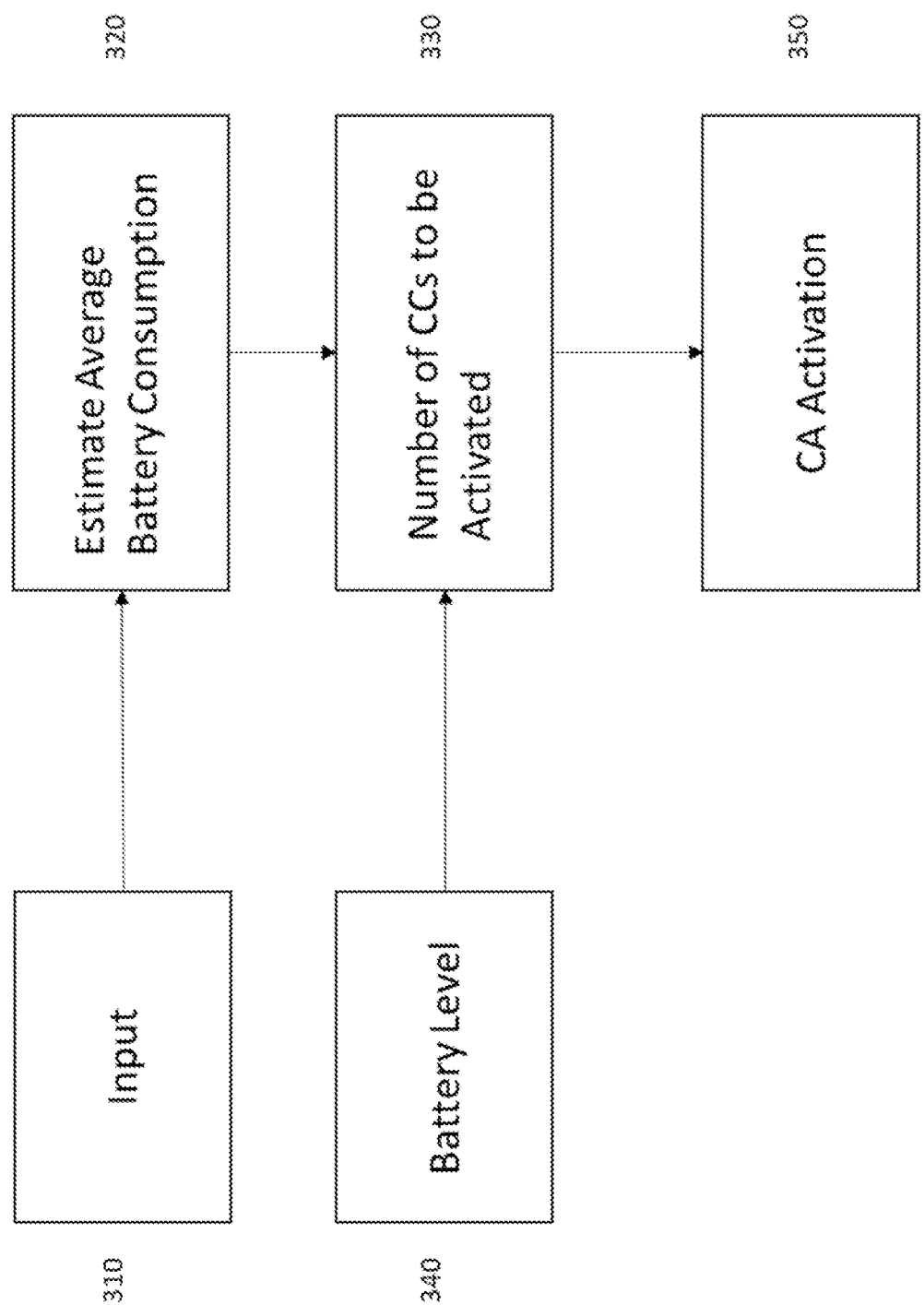
FIG. 3 illustrates a block diagram according to an exemplary embodiment of battery aware carrier aggregation activation.

FIG. 3 illustrates a block diagram according to another exemplary embodiment utilizing BACA. Block 310 comprises input which may comprise for example a sporadic battery level from a terminal device with historical data of bytes transmitted and average number of CCs used. Based, at least partly, on the input 310, an average battery consumption may be estimated in 320. The estimation may be performed using for example deterministic calculation on set of collected inputs 310. The estimation may be performed in a gNB, or any other suitable access node, or using cloud computing for example. Estimating the average battery level comprises in this exemplary embodiment estimating mAH used per one CC based on the historical data. In some exemplary embodiments, estimating the average battery level may comprise estimating mAH used per byte per one CC based on the historical data. Further, the estimation may be performed as a preliminary step in offline manner. Next, in 330, the number of additional CCs to be activated may be determined. In order to determine the number of additional CCs, the current battery level of the terminal device may be received as an input 340. Based at least on the estimated consumption of battery, in other words the estimated mAH, per byte per one CC, the current battery level of the terminal device and the buffer status of the terminal device, the number of additional CCs to be activated may be determined. If the current battery level is not received as an input from the terminal device, the gNB may predict the battery level instead. Once the number of CCs to be activated is determined, the CA activation may be performed in accordance with the determined number of CCs to be activated.

It is to be noted that as the current battery level of the terminal device may not be information that is readily available at the gNB, signalling in which the gNB transmits a request to the terminal device to transmit its current battery level may be required. Such signalling is described for example in the previous exemplary embodiment. The triggering for this request may be the reception of capability information of the terminal device when initiating the CA for the terminal device. For example, once the gNB receives a confirmation that the terminal device is compliant with CA, consequently the battery information is requested from the terminal device in order to calculate the optimal number of CCs to activate. In some exemplary embodiments, this information may be requested frequently for CA activation.

In some exemplary embodiments, the terminal device may be charged while the CA is to be performed. In such an exemplary embodiment, the battery consumption is not that critical and also, the battery status information transmitted by the terminal device no longer reflects its status. In such an exemplary embodiment, the access node, which may be a gNB, may request the terminal device to inform when the battery goes in charging mode by transmitting a corresponding request to the terminal device. In addition, the access node may take into account external context of the terminal device such as if the terminal device is indoors or outdoors. For example, there is low probability that the terminal device goes into charging mode when it is outdoors. Such context information may be be inferred with already reported radio measurements for example.

It is also to be noted that the signalling requesting and transmitting the battery level information of the terminal device may be utilized in other contexts as well. For example, other radio resource management, RRM, algorithms such as mMIMO scheduling and beamforming, may utilize the information received with this signalling.

FIG. 4 illustrates a flow chart according to another exemplary embodiment in which BACA is utilized. In this exemplary embodiment, there is a BACA algorithm that in addition to the buffer status of a terminal device also takes into account the battery level of the terminal device. The algorithm is then used to determine an optimal amount of CCs to be activated based, at least partly, on the battery level of the terminal device. Additionally, the buffer status of the terminal device may be taken into account when determining the number of additional CCs to be activated.

The flow chart starts 410 after which an average battery consumption, mAH, per byte per one CC is estimated in 420. In this exemplary embodiment, mAH represents the power consumed for a particular task for a battery with fixed DC voltage. The average mAH per byte per CC may be represented as x. When performing the estimation, the x may be calculated using historical measurement data from several terminal devices. The terminal devices may sporadically report their remaining battery level, mAH level, to an access node such as a gNB. The access node may use historical data of number of bytes transferred by the terminal devices and average number of CCs used to calculate mAH per byte per CC for x.

In 430 the access node obtains information regarding battery level of the terminal device. The information may be obtained by receiving the information from the terminal device. Alternatively, or additionally, the access node may predict the battery level and thereby obtain the information regarding the battery level of the terminal device. It is then determined if the battery level is low, meaning that it is below a threshold value, or not, meaning that it is above the threshold value. The threshold value may be pre-determined. If the battery level is not low, then the amount of CCs to be activated is determined based on the buffer status of the terminal device. The amount of CCs to be activated may be understood as a maximum value of CCs and is denoted here as m. A value for the m may be determined for example by a step-wise approach in which an additional CC is added each time a certain threshold is reached for buffer status of the terminal device.

If, however, the battery level is low, then in 450 it is determined if the transmission has high priority. If it does not have high priority, then in 460 no additional CCs are activated. This enables the battery life of the terminal device to be increased although the transmission may not be completed. Yet, the overall battery life of the terminal device may be extended which is useful for example if the terminal device is expecting more important downlink traffic in future.

However, if information regarding low battery level is obtained for high priority transmission, a successful transmission is to be made before the battery is drained. The battery may drain out after successful completion of the transfer. Therefore, in 470, an optimal number of additional CCs to be activated is determined based, at least partly, on the battery level of the terminal device using a BACA algorithm. To determine the optimal number of additional CCs, in one example of a BACA algorithm, B may be used to denote the number of bytes in downlink and/or uplink buffer of the terminal device and P may be used to denote the reported mAH level of the terminal device when the number of additional CCs to be activated for the given UE. The largest number of CCs, represented by k here, is the optimal number of additional CCs that empties DL/UL buffer of the terminal device for given battery level P. Then, for example the below algorithm may be used to determine k:

Select $1 < k \leq m$
s.t. $\quad kBx \leq P < (k+1)Bx \quad$ if $P > kBx$, $k = \{1, \ldots m\}$
$\quad k = 1 \quad\quad\quad\quad\quad\quad\quad$ if $P \leq Bx$
$n = k;$ It is to be noted that the maximum number of additional CCs to be activated is in this exemplary embodiment used as an upper limit for k. It is to be noted that any other suitable way of determining the optimal number of additional CCs to be activated such that successful completion of the high priority transmission is achieved when the terminal device has a low battery level.

As mentioned above, in some exemplary embodiments, the terminal device may be requested to transmit information regarding its battery levels periodically. This may however drain battery levels even more and cause signalling overhead. To overcome this, machine learning may be utilized to predict the power level of the terminal device such that the predicted power level is then obtained by the access node thereby removing the need to receive the power level from the terminal device. Any suitable supervised machine learning method may be utilized. In general, supervised machine learning methods may apply what has been learned in the past using labelled examples to predict future events. A supervised algorithm may require a set of data known as training data, comprising input values and labels that are considered as the output values. Starting from the analysis of the training data, the machine learning algorithm produces a model, such as a mathematical model, that makes predictions about the output values. After sufficient training, the model may provide accurate output for any new input.

In this exemplary embodiment, neural network approach is utilized. The neural network is first trained. For the training, labelled data is collected. The labelled data corresponds to historical information during network operation in which battery information of the terminal device is frequently collected. The labelled input data comprises battery level of the terminal device at a given time and also traffic and channel information at the corresponding time. Once the training has been completed, the trained neural network may be a source from which the access node obtains the battery level information, which may be the current battery level information, of the terminal device. Thus, as an input, the access node provides to the trained neural network, or any other suitable trained machine learning method, the last battery level obtained from the terminal device and traffic and channel information at the moment of the battery level information was obtained and also at a certain time after the last battery level information was obtained from the terminal device. The trained neural network then provides the estimated battery level for the terminal device at the certain time after the last battery level information was obtained.

FIG. 5 illustrates an exemplary embodiment of signalling between a terminal device and an access node when BACA and a trained machine learning method are utilized.

In this exemplary embodiment, there is a terminal device 510 and an access node 520 such as a gNB. The access node 520 transmits an enquiry 532 regarding capability, which in this exemplary embodiment is the capability for CA, of the terminal device 510. The terminal device 510 then transmits indication 534 indicating the capability which in this exemplary embodiment indicates that the terminal device 510 is capable to support carrier aggregation. Next, the access node 520 transmits an enquiry 542 regarding the battery level of the terminal device 510. The terminal device 510 then transmits an indication 544 comprising information regarding its battery level. After this, the access node 520 then transmits signalling 552 to configure one or more secondary cells corresponding to the one or more secondary carrier components that are to be configured. Then the access node 520 transmits signalling 554 to activate the one or more secondary cells and finally the access node 520 transmits signalling 556 comprising data and channel state information, CSI. Next, in 560, the access node 520 obtains information regarding the battery level of the terminal device as a predicted battery level. To obtain this predicted battery level, for example machine learning method such as described above may be utilized. Then in 570 the access node 520 may determine if a request for battery information is to be transmitted to the terminal device 510 and if yes, then it may transmit to the terminal device 510 a request for battery level information 582. Correspondingly the terminal device 510 may then transmit information regarding its battery level information 584. As the request for information regarding battery level is transmitted in this exemplary embodiment accounting for the predicted battery level, the request may be transmitted less frequently compared to a situation in which prediction is not utilized which helps to reduce signalling overhead.

The apparatus 600 of FIG. 6 illustrates an example embodiment of an apparatus that may be an access node or be comprised in an access node. The apparatus may be, for example, a circuitry or a chipset applicable to an access node to realize the described embodiments. The apparatus 600 may be an electronic device comprising one or more electronic circuitries. The apparatus 600 may comprise a communication control circuitry 610 such as at least one processor, and at least one memory 620 including a computer program code (software) 622 wherein the at least one memory and the computer program code (software) 622 are configured, with the at least one processor, to cause the apparatus 600 to carry out any one of the example embodiments of the access node described above.

The memory 620 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store current neighbour cell list, and, in some example embodiments, structures of the frames used in the detected neighbour cells.

The apparatus 600 may further comprise a communication interface 630 comprising hardware and/or software for realizing communication connectivity according to one or more communication protocols. The communication interface 630 may provide the apparatus with radio communication capabilities to communicate in the cellular communication system. The communication interface may, for example, provide a radio interface to terminal devices. The apparatus 600 may further comprise another interface towards a core network such as the network coordinator apparatus and/or to the access nodes of the cellular communication system. The apparatus 600 may further comprise a scheduler 640 that is configured to allocate resources.

FIG. 7 illustrates an apparatus 700, which may be an apparatus such as, or comprised in, a terminal device, according to an example embodiment. The apparatus 700 comprises a processor 710. The processor 710 interprets computer program instructions and processes data. The processor 710 may comprise one or more programmable processors. The processor 710 may comprise programmable hardware with embedded firmware and may, alternatively or additionally, comprise one or more application specific integrated circuits, ASICs.

The processor 710 is coupled to a memory 720. The processor is configured to read and write data to and from the memory 720. The memory 720 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 720 stores computer readable instructions that are execute by the processor 710. For example, non-volatile memory stores the computer readable instructions and the processor 710 executes the instructions using volatile memory for temporary storage of data and/or instructions.

The computer readable instructions may have been pre-stored to the memory 720 or, alternatively or additionally, they may be received, by the apparatus, via electromagnetic carrier signal and/or may be copied from a physical entity such as computer program product. Execution of the computer readable instructions causes the apparatus 700 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 700 further comprises, or is connected to, an input unit 730. The input unit 730 comprises one or more interfaces for receiving a user input. The one or more interfaces may comprise for example one or more motion and/or orientation sensors, one or more cameras, one or more accelerometers, one or more microphones, one or more buttons and one or more touch detection units. Further, the input unit 730 may comprise an interface to which external devices may connect to.

The apparatus 700 also comprises an output unit 740. The output unit comprises or is connected to one or more displays capable of rendering visual content such as a light emitting diode, LED, display, a liquid crystal display, LCD and a liquid crystal on silicon, LCoS, display. The output unit 740 may comprise two displays to render stereoscopic visual content. One display to render content to the left eye and the other display to render content to the right eye. The output unit 740 may further comprise a transmission unit, such as one or more waveguides or one or more lenses, to transfer the rendered visual content to the user's field of view. The output unit 740 further comprises one or more audio outputs. The one or more audio outputs may be for example loudspeakers or a set of headphones.

The apparatus 700 may further comprise a connectivity unit 750. The connectivity unit 750 enables wired and/or wireless connectivity to external networks. The connectivity unit 750 may comprise one or more antennas and one or more receivers that may be integrated to the apparatus 700 or the apparatus 700 may be connected to. The connectivity unit 750 may comprise an integrated circuit or a set of integrated circuits that provide the wireless communication capability for the apparatus 700. Alternatively, the wireless connectivity may be a hardwired application specific integrated circuit, ASIC.

It is to be noted that the apparatus 700 may further comprise various components not illustrated in the FIG. 7. The various components may be hardware component and/or software components.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
   at least one processor, and
   at least one memory including a computer program code, wherein the at least one memory and the computer program code are configured, with the at least one processor, to cause the apparatus to:
   receive a first indication, from a terminal device, indicating that the terminal device is capable of supporting carrier aggregation;
   obtain information regarding a battery level of the terminal device;
   estimate battery consumption per one carrier component; and
   based, at least partly, on the estimated battery consumption and information regarding the battery level, determine a number of additional carrier components to be activated for the terminal device.

2. The apparatus according to claim 1, wherein battery consumption is estimated based on historical data received from a plurality of terminal devices.

3. The apparatus according to claim 1, wherein the information regarding the battery level of the terminal device is obtained by transmitting a request to the terminal device and receiving, from the terminal device, a second indication comprising the information regarding the battery level of the terminal device.

4. The apparatus according to claim 1, wherein the information regarding the battery level of the terminal device is obtained as a prediction.

5. The apparatus according to claim 4, wherein the prediction is obtained from a trained machine learning method.

6. The apparatus according to claim 1, wherein the number of additional carrier components to be activated is additionally based on a buffer status of the terminal device.

7. The apparatus according to claim 1, wherein the apparatus is further caused to transmit a request to the terminal device to indicate an external context of the terminal device.

8. The apparatus according to claim 1, wherein estimating the battery consumption per one carrier component comprises estimating the battery consumption for one byte per carrier component.

9. The apparatus according to claim 1, wherein the apparatus comprises an access node.

10. An apparatus, comprising:
    at least one processor, and
    at least one memory including a computer program code, wherein the at least one memory and the computer program code are configured, with the at least one processor, to cause the apparatus to:
    transmit, to an access node, a first indicating that the apparatus is capable of supporting carrier aggregation;
    receive, from the access node, a request for information regarding a battery level of the apparatus;
    transmit, to the access node, a second indication comprising information regarding the battery level of the apparatus; and
    receive, from the access node, activation of one or more additional carrier components.

11. The apparatus according to claim 10, wherein the second indication indicates an external context of the apparatus.

12. The apparatus according to claim 11, wherein the external context comprises the apparatus being indoors or outdoors.

13. The apparatus according to claim 10, wherein the apparatus is further caused to transmit the second indication periodically.

14. The apparatus according to claim 10, wherein the apparatus comprises a terminal device.

15. A method, comprising:
    receiving, at an access node, a first indication, from a terminal device, indicating that the terminal device is capable of supporting carrier aggregation;
    obtaining, by the access node, information regarding a battery level of the terminal device;
    estimating, by the access node, battery consumption per one carrier component; and
    based, at least partly, on the estimated battery consumption and information regarding the battery level, determining, by the access node, a number of additional carrier components to be activated for the terminal device.

16. The method according to claim 15, wherein the estimating the battery consumption per one carrier component comprises estimating the battery consumption for one byte per carrier component.

* * * * *